United States Patent
Christ et al.

(10) Patent No.: US 8,434,962 B2
(45) Date of Patent: May 7, 2013

(54) FRICTION WELDING JOINT OF TWO TWO-DIMENSIONAL COMPONENTS POSITIONED ON TOP OF EACH OTHER

(75) Inventors: Eberhard Christ, Tambach-Dietharz (DE); Jorg Thiem, Zella-Mehlis (DE); Torsten Fuchs, Tambach-Dietharz (DE); Gerhard Dubiel, Ruhla (DE)

(73) Assignee: EJOT GmbH & Co. KG, Bad Laasphe (DE)

( * ) Notice: Subject to any disclaimer, the term of this patent is extended or adjusted under 35 U.S.C. 154(b) by 390 days.

(21) Appl. No.: 12/514,946

(22) PCT Filed: Oct. 29, 2007

(86) PCT No.: PCT/EP2007/009366
§ 371 (c)(1),
(2), (4) Date: Aug. 24, 2009

(87) PCT Pub. No.: WO2008/058625
PCT Pub. Date: May 22, 2008

(65) Prior Publication Data
US 2011/0182657 A1    Jul. 28, 2011

(30) Foreign Application Priority Data

Nov. 15, 2006  (DE) .......................... 10 2006 053 800

(51) Int. Cl.
*F16L 13/00*  (2006.01)
(52) U.S. Cl.
USPC ........ 403/271; 411/171; 228/112.1; 156/73.5
(58) Field of Classification Search .................. 403/268, 403/270, 271; 156/73.5, 308.2, 309.6, 257, 156/251; 228/112.1, 113, 114, 114.5; 29/525.14; 264/248; 411/171, 156, 371.2
See application file for complete search history.

(56) References Cited

U.S. PATENT DOCUMENTS

| | | | | |
|---|---|---|---|---|
| 2,058,452 A | * | 10/1936 | Hoffman | 411/371.2 |
| 3,477,115 A | * | 11/1969 | Martin et al. | 228/114.5 |
| 3,853,258 A | * | 12/1974 | Louw et al. | 228/2.3 |
| 4,072,441 A | * | 2/1978 | LaPointe | 408/204 |
| 4,944,977 A | * | 7/1990 | Shantz et al. | 428/36.92 |
| 5,154,340 A | * | 10/1992 | Peacock | 228/114.5 |
| 5,713,706 A | * | 2/1998 | Lozano | 411/171 |

(Continued)

FOREIGN PATENT DOCUMENTS

| | | |
|---|---|---|
| DE | 19620814 A1 | 11/1997 |
| EP | 1060826 A1 | 12/2000 |
| FR | 2883499 A1 | 9/2006 |
| GB | 2263247 A | 7/1993 |

*Primary Examiner* — Michael P Ferguson
*Assistant Examiner* — Daniel Wiley
(74) *Attorney, Agent, or Firm* — Birch Stewart Kolasch & Birch, LLP

(57) ABSTRACT

The invention relates to a friction welding joint of a plurality of two-dimensional components positioned on top of each other, which are held together by means of a connecting body, which rests on an upper component by means of a collar. The connecting body is configured as a pipe piece, and the upper component is penetrated by the connecting body having a front annular cutting edge by means of rotation and pressure, wherein the connecting body, after cutting through the upper component with the front thereof and receiving the cut-out material of the upper component in the hollow space thereof, together with the lower component forms a friction welding zone created by means of rotation and pressure of the connecting body.

15 Claims, 1 Drawing Sheet

U.S. PATENT DOCUMENTS

| | | | |
|---|---|---|---|
| 7,938,310 B2* | 5/2011 | Kleber | 228/114.5 |
| 2005/0133483 A1* | 6/2005 | Hou et al. | 219/118 |
| 2006/0213954 A1* | 9/2006 | Ruther et al. | 228/113 |
| 2007/0172335 A1* | 7/2007 | Christ | 411/408 |
| 2009/0317179 A1* | 12/2009 | Christ et al. | 403/271 |
| 2010/0119772 A1* | 5/2010 | Christ et al. | 428/138 |

* cited by examiner

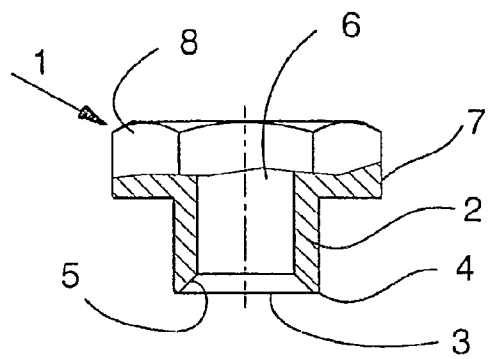
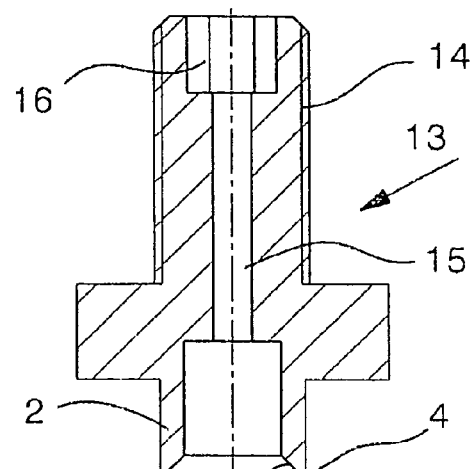
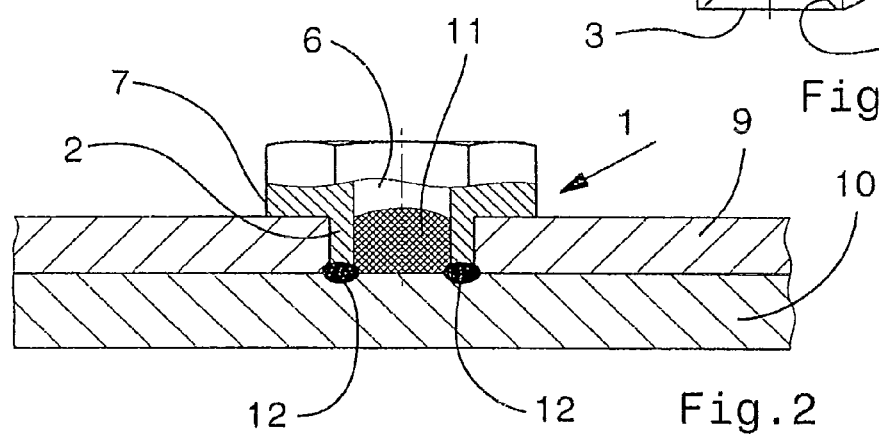
Fig. 1
Fig. 3
Fig. 2
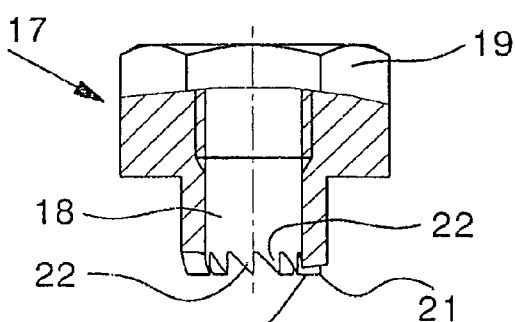
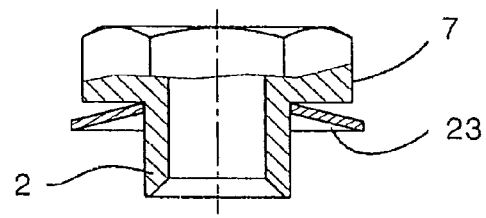
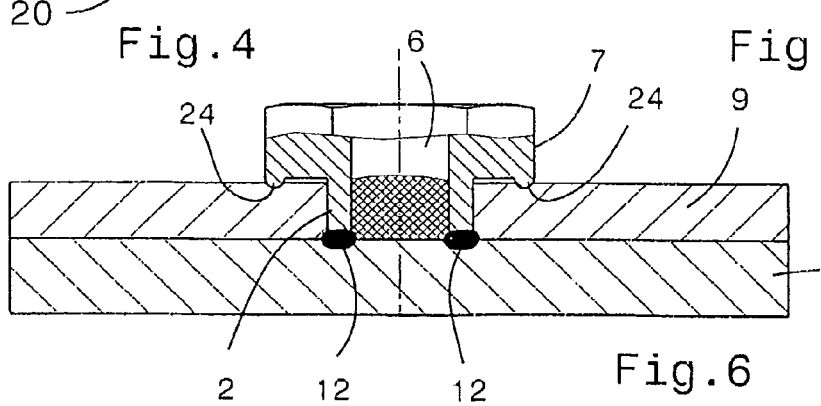
Fig. 4
Fig. 5
Fig. 6

FRICTION WELDING JOINT OF TWO TWO-DIMENSIONAL COMPONENTS POSITIONED ON TOP OF EACH OTHER

The invention relates to a friction welding joint comprising a plurality of two-dimensional components positioned on top of each other, which are held together by means of a connecting body, which rests on an upper component by means of a collar.

A friction welding joint of this type is known from DE 196 20 814 A1. Two two-dimensional components, which are positioned on top of each other and are made of the same kind of material, such as aluminum or an aluminum alloy, are held together by this known friction welding joint. The friction welding joint used for this purpose is produced by the fact that the closed front of the connecting body, which is designed either as a flat cone or having serrated grooves, is placed on the upper component and penetrates the latter by means of rotation under pressure. The upper component is plasticized, and a resulting molten material connects the two components to each other.

According to this method, the material of the upper component must be either melted or machined over the entire cross-section of the connecting body penetrating the upper component, it being unclear how the chips may be removed. If the relevant area of the upper component is melted, this requires a considerable amount of energy. The method known from the publication for producing a friction welding joint between two components positioned on top of each other therefore involves substantial technical problems.

A similar method for producing a friction welding joint between two thin sheets positioned on top of each other is disclosed in PCT publication WO 98/04381. In this method, a round stamp is used as a friction element having a radially cut-away flat front, which is pressed through the upper thin sheet by means of rotation and pressure, whereby the latter melts. The stamp then penetrates the lower thin sheet over a relatively short length, and the lower thin sheet also melts, resulting in a melt zone that cylindrically surrounds the stamp to a certain extent, by which means the two thin sheets are held together. The stamp is then withdrawn from the melt zone.

In this method as well, it remains unclear where the molten material from the lower thin sheet and, in particular, where the comparatively much more substantial amount of molten material from the upper thin sheet flows. In any case, this cannot be derived from the publication.

The knowledge that, when a connecting body penetrates an upper component of two components positioned on top of each other, the material melted thereby must be accommodated in some manner to avoid disturbance, has obviously, in consideration of the existing need to design a friction welding joint for two two-dimensional components positioned on top of each other, resulted in the method described in EP 1 230 062 B1, which, in principle, is carried out as described in WO 98/04381, whereby, however, a sleeve surrounding the stamp with clearance and pressing upon the upper part is used to additionally produce a space between the inner surface of the sleeve and the stamp, into which material from the upper and lower components may flow when this material melts, and the stamp then presses this material into this hollow space to a certain extent, from which it then flows back into the areas of the upper and lower components from which it had been pressed out, thereby refilling a relatively large zone corresponding to the plunger penetration area in the upper and lower components with liquid material that then forms the connection between the upper and lower components.

This is a method that is not easy to carry out from a technological point of view, in which, above all, large amounts of heat are required, since merely plasticizing the material of the upper or lower component is insufficient to cause the molten material to flow; instead, this material must be melted to relatively high viscosity in order to enable the material flowing into the annular space between the sleeve and the stamp to then flow back into the space from which it had been displaced.

The object of the invention is to produce a friction welding joint of a plurality of two-dimensional components positioned on top of each other, in which a concentrated rotary friction welding zone is produced in the area of a contact zone, narrowly limited in space, around a connecting body, and material that is necessarily displaced from the two-dimensional components positioned on top of each other may be collected in such a way that the material does not cause disturbance when the friction welding joint between a plurality of components positioned on top of each other and a connecting body is fully assembled.

According to the invention, this object is achieved in that the connecting body is designed as a tube piece, and the upper component is penetrated by the connecting body having a front annular cutting edge by means of rotation and pressure, wherein the connecting body, after cutting through the upper component with the front thereof and accommodating the cut-out material of the upper component in the hollow space thereof, together with the lower component forms a friction welding zone created by means of rotation and pressure of the connecting body.

Due to the design of the connecting body as a tube piece, the hollow space in the connecting body results in a space for accommodating the material from the two-dimensional components that must be displaced from the connecting body when the latter is placed under pressure and rotated, in order to ultimately produce the necessary friction welding zone in the area of the front of the tubular connecting body. Designing the connecting body as a tube makes it possible to utilize the front of this tube piece as an annular cutting edge, which needs to remove and plasticize only a relatively small amount of material from the two-dimensional components only in the relatively narrow area of contact with the two-dimensional components, which is important for providing the necessary energy for heating the material. The collar attached to the connecting body is utilized for holding the two-dimensional components together, and this connecting body rests on the upper component by means of the collar and presses the latter against a lower component, which is connected to both the front of the connecting body and the lower edge of the upper component by the friction welding zone, so that a permanent, durable connection results between the two-dimensional components positioned on top of each other. While this may preferably involve two components positioned on top of each other, a lager number of two-dimensional components may also be connected to each other in this manner.

A suitable design of the connecting body results when it is designed as a hollow bolt. However, it is also possible to design the connecting body as a nut.

The upper component may be advantageously made of light metal. However, it is also possible to design the upper component in plastic.

Similar options exist for the lower component, which may be made, for example, of either metal or plastic.

Various options for the material used also exist for the connecting body. An advantageous embodiment is to produce the connecting body from metal. However, it is also possible to design the connecting body in plastic.

To favorably design the annular cutting edge of the connecting body, which penetrates the two-dimensional components positioned on top of each other by means of rotation and pressure, with regard to the function of the annular cutting edge, the latter is advantageously provided with a sharp outer edge on the connecting body designed as a tube, the front of the tube merging with the hollow space in the shape of a funnel, which makes it easier to accommodate the molten material from the two-dimensional components.

While the outer edge may have a closed circumference in the manner of a knife blade, it is also possible to provide the outer edge with teeth.

In order to provide the collar with a desired continuous pretension in the direction of the upper component, a spring element that presses against the upper component is suitably provided between the collar and upper component. In order to provide the spring element with a desired pretension, the collar is pressed against the upper component during standstill after forming the rotary friction welding zone. This is suitably done by means of an axial compressive force acting upon the collar when the connecting body is at a standstill.

To prevent the molten material from the two-dimensional components from flowing away in the direction of the flange and to the outside on its way around the tube, the collar is suitably provided with an annular ridge on its side facing the upper component, this annular ridge acting to a certain extent as a seal to the outside in the radial direction. Due to the resulting high surface pressure, the annular ridge is pressed into the upper component.

Exemplary embodiments of the invention are illustrated in the figures, where

FIG. 1 shows a connecting body designed as a hollow bolt;

FIG. 2 shows a friction welding joint between two two-dimensional components, held together by the connecting body according to FIG. 1;

FIG. 3 shows a modification of the connecting body according to FIG. 1, having a bolt provided with an outer thread;

FIG. 4 shows a connecting body designed as a nut;

FIG. 5 shows a connecting body having a spring element;

FIG. 6 shows a connecting body having an annular ridge on the collar.

FIG. 1 shows a connecting body 1, designed as a tubular hollow bolt, which comprises tube piece 2, whose front 3 is provided with annular cutting edge 4. The material of tube piece 2 starts from annular cutting edge 4 and merges with hollow space 6 of connecting body 1 in the manner of a funnel 5.

Connecting body 1 has collar 7 on its side opposite front 3, the collar being drawn as a partial cross-section and merging with hexagon 8 on its side facing away from front 3. Hexagon 8 is used for accommodation in any chuck of a rotary machine.

FIG. 2 shows the friction welding joint, including the connecting body according to FIG. 1. This figure shows the two two-dimensional components positioned on top of one another, namely upper component 9 and lower component 10, which rest snugly on to of each other. Tube piece 2 has penetrated upper component 9 until reaching lower component 10 by means of rotation and pressure of connecting body 1, which causes displaced material 11 to be pressed out of upper component 9 into hollow space 6 in tube part 2. In the final friction welding joint, displaced material 11 is thus safely accommodated in tube piece 2 and is unable to exit therefrom, since friction welding zone 12 has formed on the front of tube piece 2 and holds component 10 securely connecting body 1. This friction welding zone 12 merges with displaced material 11, at least on the surface, and thereby holds it in place. On the other side of connecting body 1, connecting body 1 presses its collar 7 against upper component 9, which is thereby clamped to a certain extent between collar 7 and lower component 10. Instead of two components 9 and 10, three or more two-dimensional components may also be provided with the connecting body.

Instead of the connecting body according to FIG. 1, it is also possible to use the connecting body illustrated in FIG. 3, which is formed in the case by a hollow bolt 13. Thread 14, which makes it possible to attach a further component to hollow bolt 13 via any nut, is cut into hollow bolt 13. Hollow bolt 13 has a through-bore 15, which is designed like hollow space 6 in the area of front 3 (which corresponds to front 3 according to FIG. 1) and has narrower through-bore 15 in the area of thread 14, this narrower through-bore 15 ending in a hexagon socket 16 on the side of hollow body 13 facing away from front 3. Hexagon socket 16 is used to accommodate a tool of a rotary machine, by means of which connecting body 13 may be rotated as well as pressed against two-dimensional components positioned on top of each other. Reference is made to the explanations for FIG. 1 and FIG. 2 for further details on the function of connecting body 13.

FIG. 4 shows a further modification of the connecting body, in which the connecting body is a nut 17. Nut 17 has a tubular design, which means it has a hollow through-space 18 for accommodating material cut out of the upper component. As is commonly the case with a nut, connecting body 17 is provided with a hexagon in order to be securely clamped into a driving tool.

Reference is once again made to FIGS. 1 and 2 with regard to the function of front 3 of the particular connecting body, in which connecting bodies 1 and 13 are provided with blade 4 on their fronts 3, the blade running in an annular manner along the outer edge of front 3 and forming funnel 5 toward the inside, via which material cut out of upper two-dimensional component 9 may be transported into hollow space 6.

In the embodiment of connecting body 17 as a nut according to FIG. 4, front 20 is provided with teeth 22 along its outer edge 21, whereby the teeth mill material out of the upper component in the manner of a milling cutter when placed on an upper component, the material then being transported to hollow space 18 or 6 of the relevant connecting body in the manner described above.

FIG. 5 shows connecting body 1 according to FIG. 1, which, according to FIG. 5, is additionally provided with disk spring 23. Disk spring 23 is pushed onto tube piece 2 beneath collar 7 and, in the active state, as illustrated in FIG. 2, is used to press against upper component 9 under a particular spring pressure, whereby, even if rotary friction welding zone 12 (see FIG. 2) does not draw connecting body 1 snugly against upper component 9, the latter nevertheless has pressure applied to it by collar 7, due to disk spring 23, which is now under tension.

FIG. 6 shows a modification of the design of the connecting body, which in this case is provided with annular ridge 24 in the area of collar 7 on the side facing upper component 9. Annular ridge 24 runs along the outer edge of collar 7 and to a certain extent forms a seal when it comes to rest against the surface of upper component 9, so that, when material liquefied as a result of producing friction welding zone 12 is pressed from both components 9 and 10 on the outside of tube piece 2 in the direction of collar 7, the material should also flow beneath collar 7, where it is prevented from exiting to the outside by annular ridge 24.

Reference is additionally made to the fact that connecting body 1 according to FIG. 6 is pressed against upper component 9 in order to produce the aforementioned secure seal by means of annular ridge 24. This pressing action suitably takes place as a separate process at the end of connecting body rotation, i.e., when it is at a standstill, by applying pressure from its rotary tool to connecting body 1, by means of which connecting body 1 is pressed into the upper component.

The invention claimed is:

1. A friction welding joint of comprising at least a lower two-dimensional component and an upper two-dimensional component positioned on top of the lower two-dimensional component, the joint comprising:
    a connecting body having opposed first and second ends, with a collar formed at the first end, the collar having opposed upper and lower surfaces, wherein the lower surface rests on a top surface of the upper component, wherein the connecting body further includes:
        a tube piece formed at the lower surface of the collar and extending to the second end of the connecting body,
        a hollow cylindrical space formed inside the connecting body and extending from the first end thereof to the second end thereof,
        an annular cutting edge formed at the second end of the connecting body, and including a funnel having a truncated conical shape extending between the annular cutting edge and the hollow cylindrical space,
    wherein the annular cutting edge penetrates through the top surface of the upper component to a top surface of the lower component by rotation and pressure, and
    the connecting body, after cutting through the upper component, accommodates cut-out material of the upper component in the hollow cylindrical space thereof, and wherein the funnel of the annular cutting edge and the to surface of the lower component deform to create a friction welding zone by rotation and pressure of the annular cutting edge against the top surface of the lower component.

2. The friction welding joint according to claim 1, wherein the connecting body is a hollow bolt which is open along an entire length thereof.

3. The friction welding joint according to claim 2, wherein an outer perimeter of the collar of the hollow bolt has a hexagonal shape, and
    the hollow cylindrical space is formed with a length that is greater than a diameter thereof.

4. The friction welding joint according to claim 1, wherein the upper component is made of plastic.

5. The friction welding joint according to claim 1, wherein the lower component is made of metal.

6. The friction welding joint according to claim 1, wherein the lower component is made of plastic.

7. The friction welding joint according to claim 1, wherein the connecting body is made of metal.

8. The friction welding joint according to claim 1, wherein the connecting body is made of plastic.

9. The friction welding joint according to claim 1, wherein the lower surface of the collar presses against the upper component via a spring element.

10. The friction welding joint according to claim 1, wherein the lower surface of the collar is pressed against the top surface of the upper component during standstill after the friction welding zone is formed.

11. The friction welding joint according to claim 1, wherein the lower surface of the collar includes an annular ridge on an outer perimeter thereof which faces the upper component.

12. A friction welding joint comprising at least a lower two-dimensional component and an upper two-dimensional component positioned on top of the lower two-dimensional component, the joint comprising:
    a connecting body having opposed first and second ends, with a collar formed at the first end, the collar having opposed upper and lower surfaces, wherein the lower surface rests on a top surface of the upper component, wherein the connecting body further includes:
        a tube piece formed at the lower surface of the collar and extending to the second end of the connecting body,
        a hollow cylindrical space formed inside the connecting body and extending from the first end thereof to the second end thereof,
        an annular cutting edge formed at the second end of the connecting body,
    the annular cutting edge comprising a plurality of circumferentially spaced teeth,
    wherein the annular cutting edge penetrates through the top surface of the upper component to a top surface of the lower component by rotation and pressure, and
    the connecting body, after cutting through the upper component, accommodates cut-out material of the upper component in the hollow cylindrical space thereof, and wherein the teeth of the annular cutting edge and the top surface of the lower component deform to create a friction welding zone by rotation and pressure of the annular cutting edge against the top surface of the lower component.

13. The friction welding joint according to claim 12, wherein the lower surface of the collar presses against the upper component via a spring element.

14. The friction welding joint according to claim 12, wherein the lower surface of the collar is pressed against the top surface of the upper component during standstill after the friction welding zone is formed.

15. The friction welding joint according to claim 12, wherein the lower surface of the collar includes an annular ridge on an outer perimeter thereof which faces the upper component.

* * * * *